Feb. 22, 1949.　　　A. HAGEN　　　2,462,740
GASOLINE FILTER
Filed Dec. 12, 1945
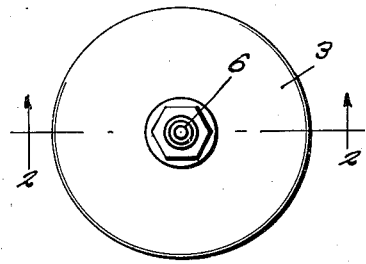
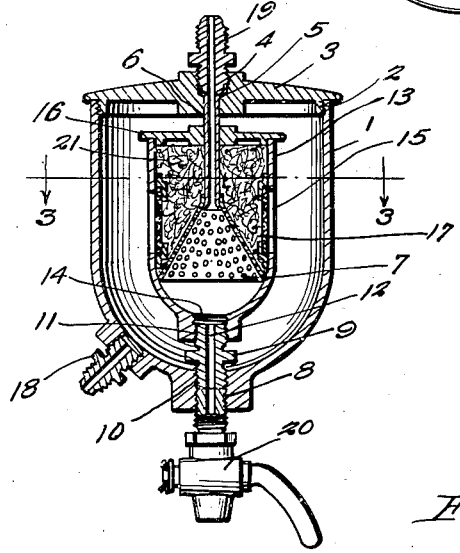
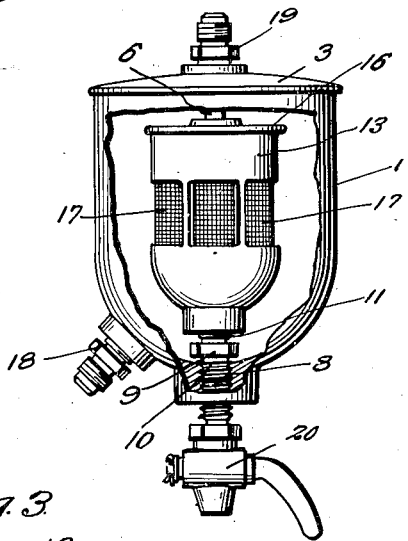
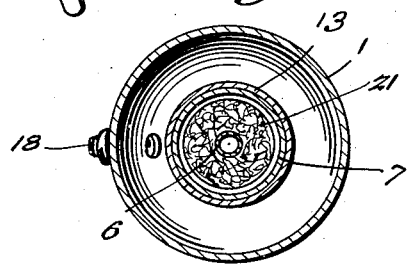
Inventor
ASBJORN HAGEN
By Clarence A. O'Brien
and Harvey B. Jacobson
Attorneys Patented Feb. 22, 1949

2,462,740

UNITED STATES PATENT OFFICE 2,462,740

GASOLINE FILTER

Asbjorn Hagen, Kississing, Manitoba, Canada

Application December 12, 1945, Serial No. 634,471

2 Claims. (Cl. 210—187)

This invention relates to new and improved filters, and more particularly to a gasoline filter which will be used in connection with the gasoline supply for an internal combustion engine in an automobile.

An object of the invention is to provide a gasoline filter of novel design which will be positioned between the gasoline tank and the carburetor of an internal combustion engine of an automobile.

A further object of the invention is to provide a filter which will be highly efficient when used in filtering the gasoline from an automobile gasoline tank to the carburetor of an automobile internal combustion motor.

The invention accordingly comprises the elements and combinations of elements, features of construction, and arrangements of parts which will be exemplified in the structures hereinafter described, and the scope of the application of which will be indicated in the following claims.

In the accompanying drawings which form a part of the application,

Figure 1 is a plan view of the improved filter;

Figure 2 is a vertical sectional view through the filter taken on line 2—2 of Figure 1;

Figure 3 is a transverse sectional view taken on line 3—3 of Figure 2, and

Figure 4 is a side elevation of the filter being partly broken away to show the interior arrangement of parts.

Like characters of reference are used throughout the following specification and the accompanying drawings to designate corresponding parts.

In carrying out the invention, an outer cylindrical container or chamber 1 is provided and is internally threaded as at 2 at its upper end. A threaded cap or cover 3 is adapted to cooperate with the threaded upper end of the chamber 1 to close the same.

Formed in the cap or cover 3 is a central threaded opening 4 which is tapered at its lower end to form an annular seat 5, in which the tube 6, flared at its opposite ends is adapted to seat. Supported on the flared lower end of the tube 6, is a perforated conical-shaped filter 7, as clearly shown in Figure 2 of the drawing.

A centrally-located threaded opening 8 is formed through the bottom of the chamber 1, and is adapted to receive the nipple 9 provided with threads 10 on its lower end, and with the threads 11 on its upper end, said nipple being also formed with a central passage 12.

A cylindrical material container 13 similar in shape to but smaller than the container 1, is provided at its lower end with a threaded centrally-located opening 14 adapted to be screwed on to the threads 11 on the nipple 9, to support the container 13 within the chamber 1 in spaced relation thereto. A plurality of windows or openings 15 are formed through the side wall of the container 13, and a cap or cover 16 is provided for closing the upper end of the said container 13.

The tube or sleeve 6 supported by and depending from the cap 3 extends through the cap or cover 16 in such a manner that the conical-shaped filter 7 will extend down in the container 13 to a point adjacent its bottom, and to a point below the windows or openings 15 formed in the side wall of the said container 13.

A fine mesh wire filter screen 17 will be placed within the container adjacent its inner wall and extend a slight distance above and below the said windows or openings 15. Fine steel wool 21 is packed within the container 13 to fill the space above the conical filter 7 to the top of the said container 13.

The threaded nipple 18 will be screwed into and through the lower portion of the chamber 1 to provide means for connecting the filter to the carburetor of an automobile engine. A similar threaded nipple 19 will be threaded into the central threaded opening 4 through the cap or cover 3 and is adapted to be connected with a gasoline tank, thus the gasoline filter will be located between the gasoline tank and the carburetor of an internal combustion engine in a motor vehicle.

The petcock 20 will be screwed into the lowermost part of the chamber 1, so that from time to time, it may be opened to drain impurities filtered from the gasoline, from the filter.

Many minor changes in detail of construction may be resorted to without departure from the spirit of the invention.

Having thus described my invention what I claim as new and desire to secure by Letters Patent of the United States is:

1. A filter comprising similarly shaped outer and inner containers having substantially parallel walls and formed with separate vertically spaced removable centrally apertured covers, said inner container having spaced circumferentially disposed side openings through its side wall, fine mesh wire screen supported interiorly of said inner container overlying said side openings, an inverted cone-shaped perforated filter in said inner container supported by a tube extending through both of said covers, a filter mass in said inner container disposed above said inverted cone-shaped perforated filter between the same and said fine mesh wire screen, a fluid inlet nipple connection supported centrally of said outer cover in axial alignment with said tube, a bottom nipple extending between and through the bottom portions of said containers in axial alignment with said inlet nipple, a petcock on the bottom nipple, and a fluid outlet nipple extending through the lower side wall of said outer container.

2. A filter comprising similarly shaped outer and inner concentrically disposed containers having substantially parallel walls and formed with separate vertically spaced removable centrally apertured covers, said inner container having spaced circumferentially disposed side openings through its side wall, fine mesh wire screen supported interiorly of said inner container overlying said side openings, an inverted cone-shaped perforated filter in said inner container supported by a tube extending through both of said covers, said perforated filter being adapted to engage the inner side wall of said inner container and being spaced above the lower end thereof, a filter mass in said inner container disposed above said inverted cone-shaped perforated filter between the same and said fine mesh wire screen, a fluid inlet nipple connection supported centrally of said outer cover in axial alignment with said tube, a bottom nipple extending between and through the bottom portions of said containers in axial alignment with said inlet nipple, a petcock on said bottom nipple, and a fluid outlet nipple extending through the lower side wall of said outer container.

ASBJORN HAGEN.

REFERENCES CITED

The following references are of record in the file of this patent:

UNITED STATES PATENTS

| Number | Name | Date |
|---|---|---|
| 289,980 | Chevallot | Dec. 11, 1883 |
| 895,083 | Gardiner | Aug. 4, 1908 |
| 999,759 | Dondey et al. | Aug. 8, 1911 |
| 1,337,020 | Milker | Apr. 13, 1920 |
| 1,723,374 | Roehr | Aug. 6, 1929 |
| 1,862,916 | Weymouth et al. | June 14, 1932 |
| 2,348,651 | Schelly | May 9, 1944 |
| 2,412,043 | Griffin et al. | Dec. 3, 1946 |